(12) United States Patent
Baker (10) Patent No.: US 8,459,036 B2
(45) Date of Patent: Jun. 11, 2013

(54) AIRCRAFT NOZZLE HAVING ACTUATORS CAPABLE OF CHANGING A FLOW AREA OF THE AIRCRAFT NOZZLE

(75) Inventor: Von David Baker, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 662 days.

(21) Appl. No.: 12/627,625

(22) Filed: Nov. 30, 2009

(65) Prior Publication Data

US 2010/0162684 A1 Jul. 1, 2010

Related U.S. Application Data

(60) Provisional application No. 61/203,713, filed on Dec. 26, 2008.

(51) Int. Cl.
*F02K 1/09* (2006.01)

(52) U.S. Cl.
USPC .................. 60/771; 60/226.3; 239/265.15

(58) Field of Classification Search
CPC .......................................................... F02K 9/10
USPC ............. 60/226.1–226.3, 232, 242, 262, 767, 60/770–771; 239/265.15, 265.27, 265.31, 239/265.33, 265.37, 265.19
See application file for complete search history.

(56) References Cited

U.S. PATENT DOCUMENTS

| | | | |
|---|---|---|---|
| 3,094,072 A * | 6/1963 | Parilla | 244/3.22 |
| 3,658,253 A | 4/1972 | Steffen | |
| 3,662,556 A | 5/1972 | Poucher et al. | |
| 3,779,010 A | 12/1973 | Chamay et al. | |
| 3,792,584 A * | 2/1974 | Klees | 60/204 |
| 3,797,785 A | 3/1974 | Baerresen et al. | |
| 3,814,324 A * | 6/1974 | Wanger | 239/265.31 |
| 3,820,719 A | 6/1974 | Clark | |
| 3,841,091 A | 10/1974 | Sargisson et al. | |
| 3,940,092 A | 2/1976 | Farris | |
| 4,043,508 A | 8/1977 | Speir et al. | |
| 4,295,611 A | 10/1981 | Wynosky et al. | |
| 4,387,564 A * | 6/1983 | Carey | 60/242 |
| 4,501,393 A | 2/1985 | Klees et al. | |
| 4,527,388 A | 7/1985 | Wallace, Jr. | |
| 4,592,508 A | 6/1986 | Thornock | |
| 4,716,724 A | 1/1988 | Newton | |
| 4,802,629 A | 2/1989 | Klees | |
| 5,165,227 A | 11/1992 | Grieb | |
| 5,211,008 A | 5/1993 | Fage | |
| 5,655,360 A | 8/1997 | Butler | |
| 5,706,649 A | 1/1998 | Robinson et al. | |
| 5,778,659 A | 7/1998 | Duesler et al. | |
| 5,806,302 A * | 9/1998 | Cariola et al. | 60/204 |
| 5,996,937 A | 12/1999 | Gonidec et al. | |

(Continued)

*Primary Examiner* — Andrew Nguyen
(74) *Attorney, Agent, or Firm* — Kreig DeVault LLP (57) ABSTRACT

A nozzle is provided that can be used as part of an aircraft engine. In one form the nozzle includes an inner cowl and an outer cowl. The inner cowl can be actuated to a variety of positions. The outer cowl is piggybacked on the inner cowl and is initially retained in first position relative to the inner cowl with an outer cowl actuator. The outer cowl actuator can be commanded to release the outer cowl so that the outer cowl can be moved to a second position relative to the inner cowl. In one form the outer cowl actuator is an explosive bolt and a spring is provided to urge the outer cowl to the second position.

12 Claims, 6 Drawing Sheets

U.S. PATENT DOCUMENTS

| | | |
|---|---|---|
| 6,735,936 B2 | 5/2004 | Rey et al. |
| 6,826,901 B2 | 12/2004 | Hebert |
| 7,010,905 B2 | 3/2006 | Lair |
| 7,174,704 B2 | 2/2007 | Renggli |
| 7,178,338 B2 | 2/2007 | Whurr |
| 2003/0126853 A1 | 7/2003 | Koshoffer et al. |
| 2004/0006969 A1 | 1/2004 | Whurr |
| 2005/0229587 A1* | 10/2005 | Hervio .......................... 60/230 |
| 2007/0062199 A1* | 3/2007 | Cowan et al. .................. 60/770 |
| 2009/0139202 A1* | 6/2009 | Agrawal et al. ............. 60/226.3 |

* cited by examiner

AIRCRAFT NOZZLE HAVING ACTUATORS CAPABLE OF CHANGING A FLOW AREA OF THE AIRCRAFT NOZZLE

CROSS REFERENCE TO RELATED APPLICATIONS

The present application claims the benefit of U.S. Provisional Patent Application No. 61/203,713, filed Dec. 26, 2008, and is incorporated herein by reference.

GOVERNMENT RIGHTS

The present application was made with the United States government support under Contract No. F33615-03-D-2357-0006, awarded by the United States Air Force. The United States government has certain rights in the present application.

FIELD OF THE INVENTION

The present invention generally relates to aircraft nozzles, and more particularly, but not exclusively, to actuation arrangements for aircraft nozzles.

BACKGROUND

Changing an area or areas of an aircraft nozzle in an efficient manner remains an area of interest. Some existing systems have various shortcomings relative to certain applications. Accordingly, there remains a need for further contributions in this area of technology.

SUMMARY

One embodiment of the present invention is a unique nozzle actuation system. Other embodiments include apparatuses, systems, devices, hardware, methods, and combinations for controlling nozzle throat and/or exit area. Further embodiments, forms, features, aspects, benefits, and advantages of the present application shall become apparent from the description and figures provided herewith.

DETAILED DESCRIPTION OF REPRESENTATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
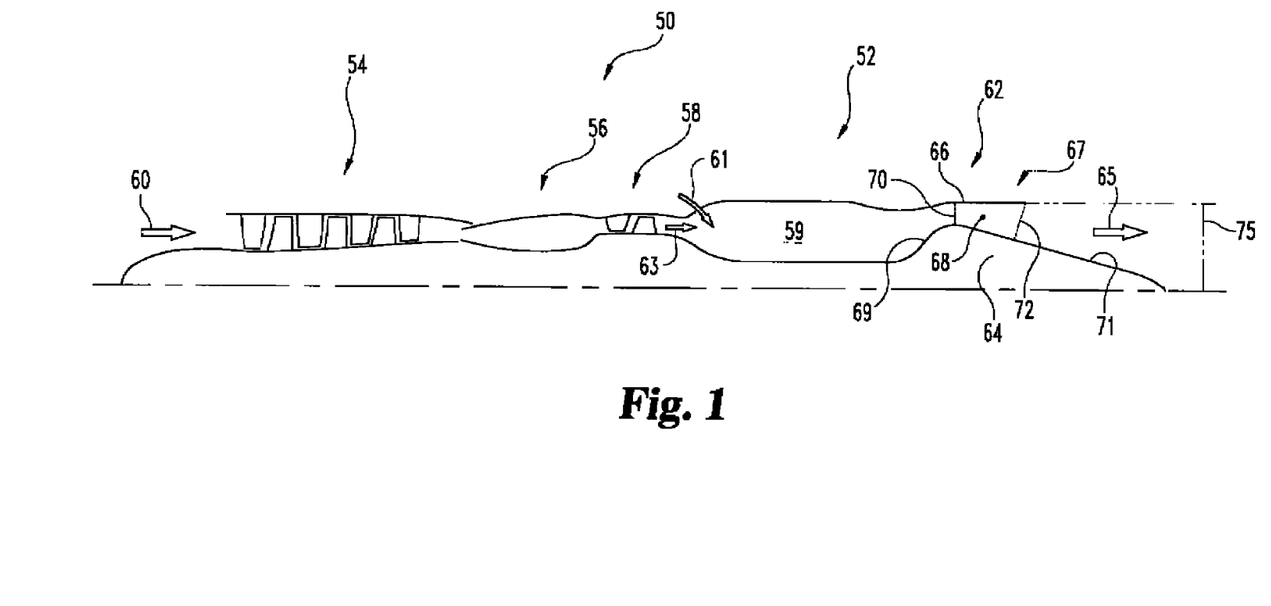
FIG. 1 depicts a partial cross-sectional view of an aircraft engine.

With reference to FIG. 1, an aircraft engine 50 is depicted having a ramburner 52 located downstream of a compressor 54, combustor 56, and turbine 58 which together may be used to provide propulsive power to an aircraft. As used herein, the term "aircraft" includes, but is not limited to, airplanes, unmanned space vehicles, fixed wing vehicles, variable wing vehicles, uninhabited combat air vehicles, and others. Though the aircraft engine 50 is depicted having a single compressor and turbine spool, other embodiments can include additional spools as will be appreciated by those of skill in the art. In addition, the compressor 54 and turbine 58 can have any number of stages and can have inlet guide vanes or exit guide vanes. The aircraft engine 50 can be any type of gas turbine engine and can take the form of a turbojet, turbofan, ramburner, ramjet, or scramjet, to set forth just a few non-limiting examples. In some embodiments, the aircraft engine 50 can be coupled with other power plants and can form part of a variable or adaptive cycle engine, to set forth just a few non-limiting possibilities.

A flow stream entering the aircraft engine 50 is split into core flow stream 60 and bypass flow stream 61. The core flow stream 60 is compressed by the compressor 54 before being mixed with fuel and burned in the combustor 56. The products of combustion from the combustor 56 form a combustion flow stream 63 at least part of which flows through the turbine 58. The turbine 58 extracts useful work from the combustion flow stream 63 to drive various components of the aircraft engine 50. Upon exiting the turbine 58 the combustion flow stream enters the ramburner 52.

Fuel is injected into the ramburner 52 and is mixed with the combustion flow stream 63 as well as at least a portion of the bypass flow stream 61. The fuel/air mixture is then combusted in a ramburner combustor 59 before it flows out of a ramburner exit 62 as an exhaust flow 65. The bypass flow stream 61 provides additional oxygen to the ramburner combustion process while also cooling down the vitiated combusted gases so that ramburner outlet temperatures are maintained within material capability limits. Some embodiments of the ramburner 52, however, may not maintain temperatures within material capability limits during some portions of operation. One embodiment of the ramburner 52 includes uncooled, non-metallic structural features that form a main flow path, and in some embodiments a secondary flow path, of the ramburner. In some embodiments, an active cooling scheme may be employed either alternatively and/or additionally.

In one form the ramburner exit 62 includes a plug nozzle 64 and a movable cowl 66. The plug nozzle 64 is fixed in the illustrative embodiment, but can be translated, rotated, or otherwise moveable in other embodiments. The plug nozzle 64 forms part of an exit flow path 68 and has a rising front side 69 and a descending back side 71. The plug nozzle 64 can take on other forms in different embodiments. The plug nozzle 64 and cowl 66 form an exit nozzle 67 which is depicted as a convergent-divergent (CD) nozzle in the illustrative embodiment.

The exit nozzle 67 includes an exit flow path 68 having a throat area 70 and an internal exit area 72, and an external exit area 75. In a typical convention, the throat area 70 is denoted as A8 and the external exit area 75 is denoted as A9; an external exit area ratio is the exit area A9 divided by the throat area A8, often expressed as A9/A8. In some applications, the aircraft engine 50 may be installed on an aircraft having a boattail and the exit nozzle 67 can have an internal exit area $A9_{int}$ and an external area $A9_{ext}$. In these applications, $A9_{ext}$ can be fixed and $A9_{int}$ can be variable. Both throat area 70 and exit area 72 are annular areas between the plug nozzle 64 and the cowl 66, but may take on different forms in other embodiments. At least part of the exhaust flow 65 crosses both the throat area 70 and the exit area 72 as it exits the aircraft engine 50. Though the exit nozzle 67 is depicted as a convergent-divergent nozzle, in some forms of operation the exit nozzle 67 may only be a convergent nozzle.

Figure 2:
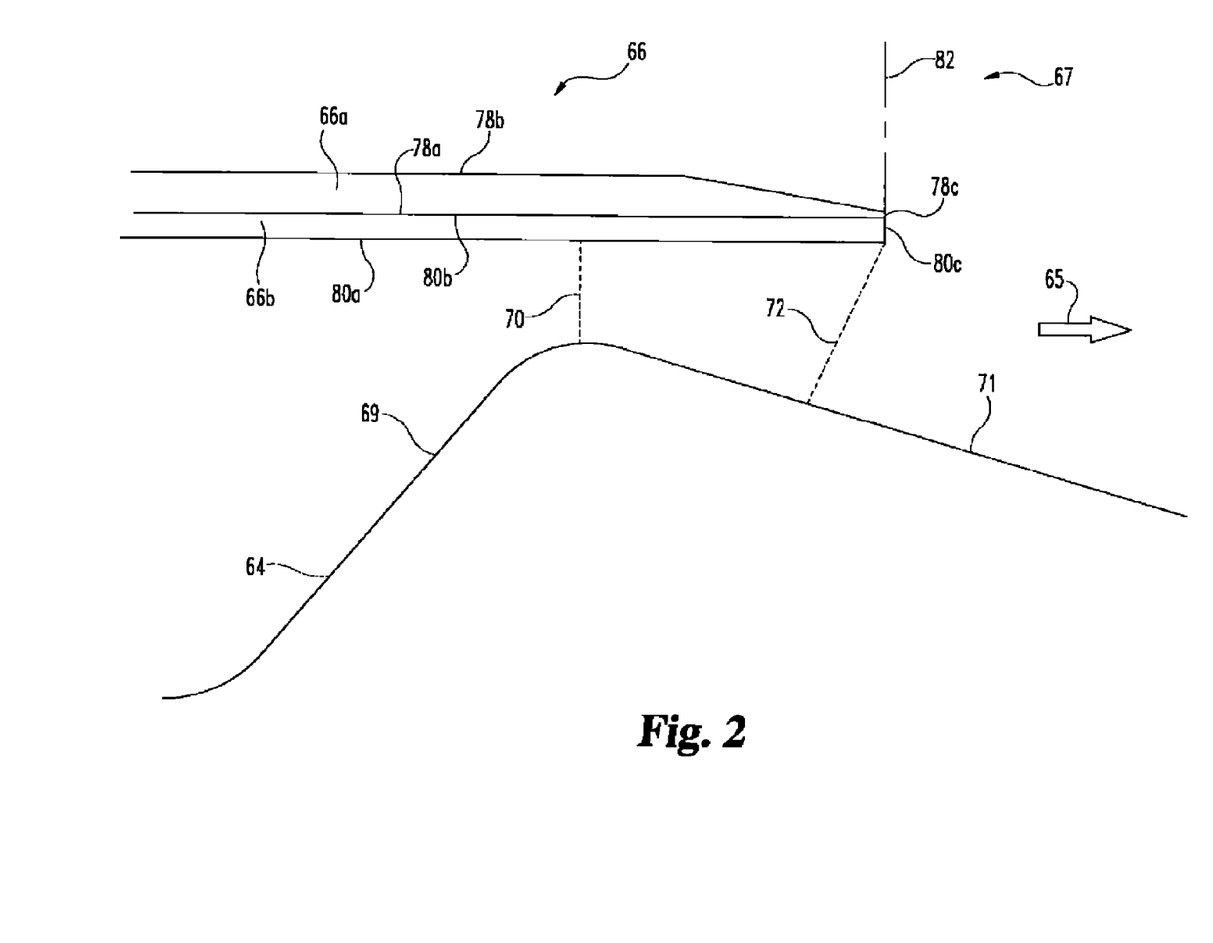
FIG. 2 depicts a partial cross-sectional view of one embodiment of a nozzle.

Turning now to FIG. 2, a partial cross-sectional view is shown of one embodiment of the cowl 66 and the plug nozzle 64. The throat area 70 and internal exit area 72 are also depicted in FIG. 2. The cowl 66 includes an outer cowl 66*a* and an inner cowl 66*b* which are capable of being moved to a variety of axial positions as will be discussed further hereinbelow. The outer cowl 66*a* has an inner surface 78*a*, outer surface 78*b*, and tip 78*c*. The tip 78*c* and the plug nozzle 64 form the internal exit area 72. The tip 78*c* is located downstream of the throat 70 at a stream location 82, since in the illustrative embodiment the exit nozzle 67 is a CD nozzle. In some embodiments where the exit nozzle 67 is a convergent nozzle, the tip 78*c* may be located coincident with the throat 70.

The inner cowl 66*b* includes an inner surface 80*a*, an outer surface 80*b*, and a tip 80*c*. The inner surface 80*a* forms a flowpath surface for the exhaust flow 65 between the cowl 66 and the plug nozzle 64. In some forms, however, the inner surface 80*a* may only form part of the flow surface. For example, the tip 80*c* may only extend to location upstream of the stream location 82 such that the inner surface 78*a* of the outer cowl 66*a* also forms a flowpath surface for the exhaust downstream of the tip 80*c*. In the illustrative embodiment the tip 80*c* is located at the stream location 82 coincident with the tip 78*c* of the outer cowl 66*a*. In other embodiments the tip 80*c* can be downstream of the tip 78*c*.

Figure 3:
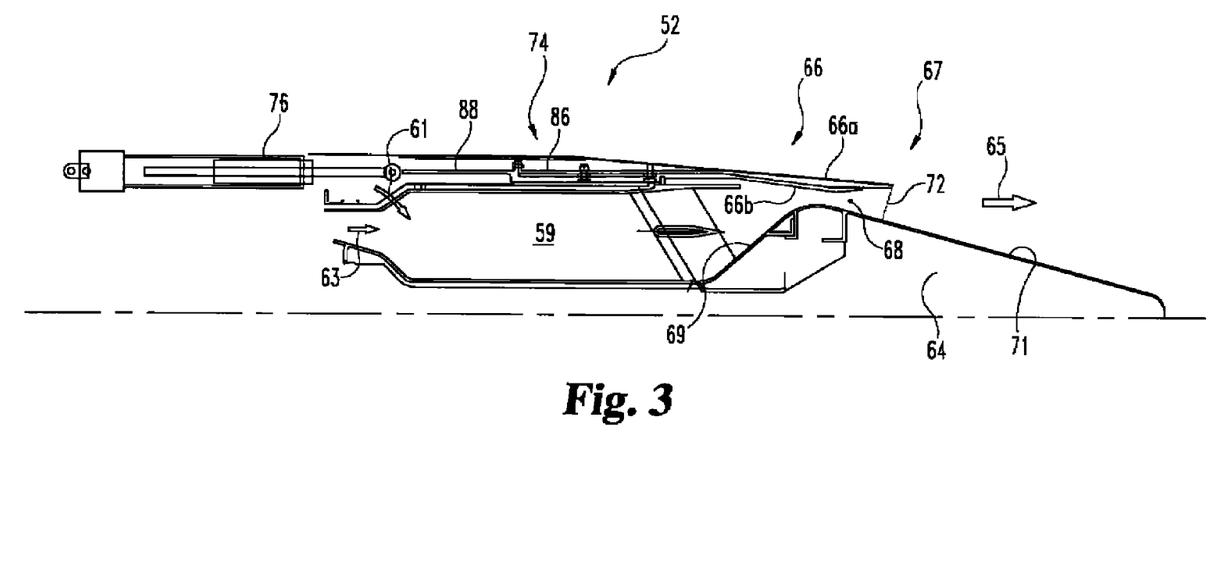
FIG. 3 depicts a partial cross-sectional view of one embodiment of a nozzle.
Figure 4:
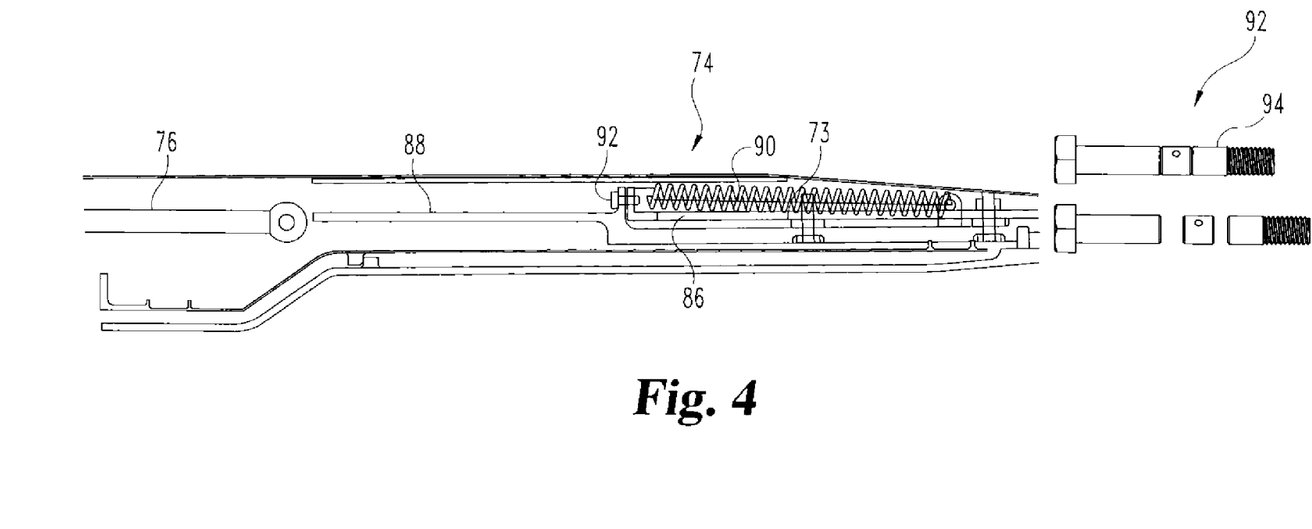
FIG. 4 depicts a partial cross-sectional view of one embodiment of the present application.

Turning now to FIGS. 3 and 4, partial cross-sectional views are provided of various aspects of the aircraft engine 50 (shown in FIG. 1). Outer cowl actuator 74 and an inner cowl actuator 76 provide at least some of the motive force, or may remove some of the resistive force, necessary to move the outer cowl 66*a* and the inner cowl 66*b*. In the illustrative embodiment, the outer cowl 66*a* and the inner cowl 66*b* are configured to be slidingly moveable, but other forms of movement may also be used so long as the movement produces a change in axial position of the outer cowl 66*a* and the inner cowl 66*b*, either directly or indirectly.

The outer cowl actuator 74 initially secures the outer cowl 66*a* to the inner cowl 66*b*. Specifically, the outer cowl actuator 74 couples an outer cowl arm 86 attached to the outer cowl 66*a* to an inner cowl arm 88 attached to the inner cowl 66*b*. When activated, the outer cowl actuator 74 releases the outer cowl 66*a* from the inner cowl 66*b* to permit the outer cowl 66*a* to travel free of the inner cowl 66*b* until it reaches a stabilizing detent 73. The detent 73 can take many forms and can either be a detent that fixedly secures the outer cowl 66*a* to the inner cowl 66*b*, or can be a detent that permits relative movement between the two. The outer cowl actuator 74 can be operated so that movement of the outer cowl 66*a* relative to the inner cowl 66*b* occurs only once. In some embodiments, the outer cowl actuator 74 may be used to couple the outer cowl 66*a* to other structure but otherwise operate to release the outer cowl 66*a* to travel freely when desired. Multiple outer cowl actuators 74 can be arranged around the circumferential periphery of the aircraft engine 50. The outer cowl actuator 74 can be initiated by a controller (not shown) based upon, for example, flight condition. In one non-limiting application, the outer cowl actuator 74 can be initiated when nozzle pressure ratio (NPR) reaches a predetermined value related to a flight condition Mach number. For example, the outer cowl actuator 74 can be initiated when the NPR reaches a value corresponding to Mach 1.5. The outer cowl actuator 74 can also be activated based upon an inlet total temperature sensor switch. Other devices, measurements, calculations, etc. can be used to initiate the outer cowl actuator 74.

The outer cowl actuator 74 can take the form of a spring actuation system that includes a spring 90 and an explosive bolt 92. The explosive bolt 92 can slide into apertures formed in a flange of the inner cowl arm 88 and a flange formed in the outer cowl arm 86. In one form the explosive bolt 92 includes a frangible shaft 94 that is operable to break, shatter, or otherwise separate when an explosive device is initiated. In some embodiments, the explosive bolt 92 can be replaced by a bolt and explosive nut. In some embodiments, the explosive bolt 92 can be replaced by other types of systems that initially retain outer cowl arm 86 in a fixed relationship to inner cowl arm 88, but that upon command release the outer cowl arm 86 to be able to slide axially downstream. For example, an electromagnet system may be employed in some applications to retain the outer cowl arm 86 in fixed relation to the inner cowl arm 88, to set forth just one non-limiting example. In still other examples, the explosive bolt could be replaced by a 28 VDC solenoid valve, or a simple bell crank and push rod.

In the illustrative embodiment the spring 90 is initially tensioned such that when the explosive bolt 92 is broken the force created by the spring 90 urges the outer cowl arm 86 to move axially downstream until the tension in spring 90 is relieved or the tension is offset by an opposing force, such as might be the case if the outer cowl arm 86 engages a detent or other resistive device. In some embodiments, a blow-off load that is experienced by the outer cowl 66*a* might tend to drive the outer cowl 66*a* aft if a forward projected surface of the outer cowl 66*a* is designed to be exposed to higher upstream gas pressures. In this embodiment, the spring 90 could be used simply to reinforce the normal blow-off load and thereby stabilize the outer cowl 66*a*. In some embodiments, furthermore, the outer cowl 66*a* can be configured to eliminate the spring force entirely and rely only on the normal blow-off load to translate the outer cowl 66*a*. Though the spring 90 is initially tensioned in the illustrative embodiment, other forms may include a spring arrangement that is initially compressed.

The spring 90 is depicted as a helical coil spring in the illustrative embodiment, but other types of springs may be used, such as a leaf spring, a torsional spring, and/or a volute spring, to set forth just a few non-limiting examples. Although the motion of outer cowl arm 86 is described as axial, other motions can also be suitable so long as the outer cowl 66*a* moves to a different axial position. For example, the spring 90 may be a torsional spring that causes the outer cowl arm 86 to move in at least a partially circumferential direction. In such an embodiment, the outer cowl arm 86 can move in a helical track such that circumferential movement is accompanied by an axial translation.

The inner cowl actuator 76 is coupled to the inner cowl 66*b* with outer cowl arm 86 and provides a motive force to move the inner cowl 66*b* in the illustrative embodiment. Any number of inner cowl actuators 76 may be used around the periphery of the aircraft engine 50 to effectuate movement of the inner cowl 66*b*. The inner cowl actuator 76 can provide an actuation stroke in a forward and aft direction. In some forms the inner cowl actuator 76 can also provide helical movements of the inner cowl 66*b*, if so desired. The inner cowl actuator 76 can take a variety of forms such as pneumatic, hydraulic, and electric, to set forth just a few examples. If pneumatic the inner cowl actuator 76 can be powered by compressor bleed air from the compressor 54 (shown in FIG. 1), but other sources of air may also be used.

Figure 5:
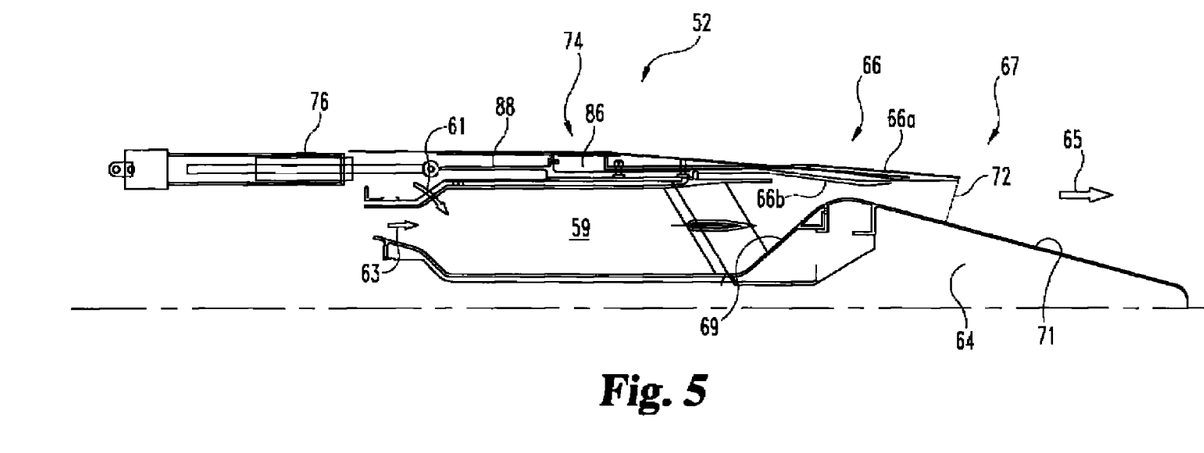
FIG. 5 depicts a partial cross-sectional view of one embodiment of a nozzle.
Figure 6:
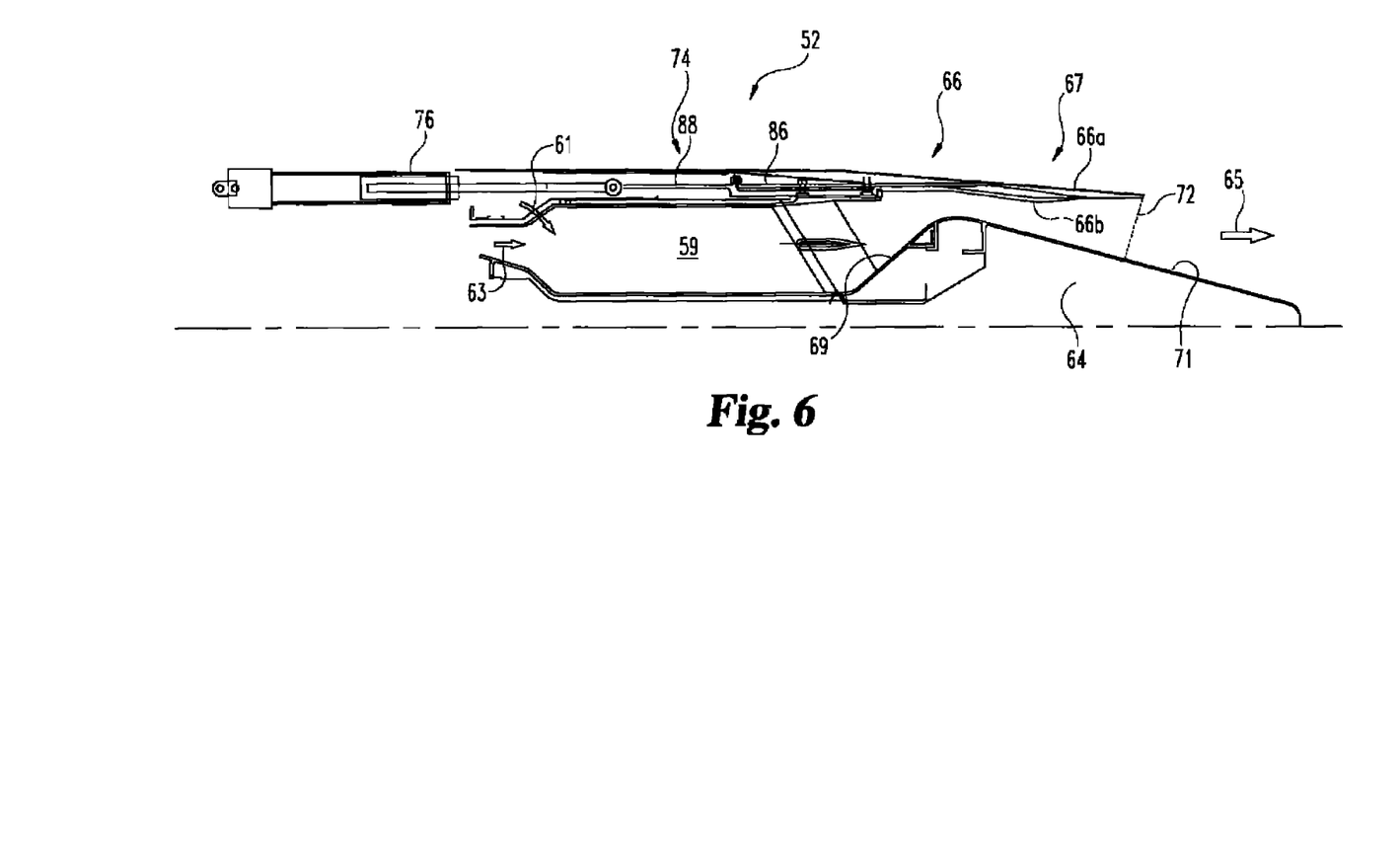
FIG. 6 depicts a partial cross-sectional view of one embodiment of a nozzle.

Referring now to FIGS. 3, 5, and 6, partial cross-sectional views are provided of the cowl 66 in various stages of movement. FIG. 3 depicts the cowl 66 at an operating condition characterized by the outer cowl 66a and the inner cowl 66b in a forward position. In this position, the actuators 74 and 76 retain the cowl in position. In some applications, the relative orientation of the cowl 66 and plug nozzle 64 depicted in FIG. 3 corresponds to dry operation between Mach 0.5 and 1.5. FIG. 5 depicts the cowl 66 at another operating condition characterized by the outer cowl 66a being moved to an aft position and the inner cowl 66b remaining in a forward position. To achieve this position, the outer cowl actuator 74 has been actuated and the outer cowl 66a has been moved to an aft position. In some applications, the relative orientation of the cowl 66 and plug nozzle 64 depicted in FIG. 5 corresponds to dry operation between Mach 1.5 and 3.3. FIG. 6 depicts the cowl 66 at an operating condition characterized by the outer cowl 66a and the inner cowl 66b in an aft position. In some applications, the relative orientation of the cowl 66 and plug nozzle 64 depicted in FIG. 6 corresponds to ramburner operation between Mach 3.3 to 4.0+.

In some embodiments, the cowl 66 and actuators 74 and 76 may be used in different types of engines. For example, the cowl 66 may be used in an aircraft engine that lacks a ramburner combustor. The cowl 66 may also be used in a turbojet engine having an afterburner section. Other engine types and configurations may also use embodiments of the cowl and actuators.

One embodiment of the present application provides an aircraft engine apparatus comprising a first and second actuator operable to change a throat area and an exit area of a nozzle, the first actuator operable to be commanded to a release condition, the second actuator operable to be commanded to a position.

One form of the present application provides an apparatus comprising a first and second actuator capable of changing the configuration of a convergent-divergent nozzle; a first cowl capable of being moved to a first cowl position by the first actuator; and a second cowl configured to be releasably coupled to the first cowl through the second actuator, the second cowl having a second cowl first position and a second cowl second position, the second cowl second position is dependent upon the position of the first cowl position.

Another form of the present application provides an apparatus comprising an aircraft engine nozzle having an outer cowl and an inner cowl; and means for varying a flow stream cross-sectional area in the aircraft engine nozzle.

Yet another form of the present application provides an aircraft engine comprising releasing a first nozzle cowl from a set position relative to an aircraft engine, the first nozzle cowl operable to move predominantly in one direction from a first position to a second position upon the releasing; and actuating a second nozzle cowl, the second nozzle cowl operable to move relative to the aircraft engine, the second position of the first nozzle cowl being fixed relative to the second nozzle cowl.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An aircraft engine apparatus comprising:
   a gas turbine engine including a combustor used to combust a fuel and air mixture, a turbine positioned downstream of the combustor and structured to receive the combusted fuel and air mixture, and a ramburner positioned downstream of the turbine and structure to receive an expanded flow of the combusted fuel and air mixture from the turbine wherein the ramburner also includes a fuel injector oriented to deliver fuel to the ramburner for a ramburning combustion;
   a nozzle having a center plug nozzle and structured to receive a flow that develops from the ramburning combustion, the nozzle having a first and second actuator operable to change a throat area and an exit area of the nozzle, the first actuator operable to be commanded to a non-reversible release condition in which a first cowl attached to the first actuator moves to a downstream location relative to a second cowl and that the first cowl cannot be recalled by the first actuator once the first actuator is commanded to the non-reversible release condition, the second actuator operable to be commanded to a position during operation of the gas turbine engine; and
   wherein a nozzle flow surface is gradually formed during deployment of the first cowl and wherein the nozzle flow surface that is gradually formed is substantially exposed to the flow stream throughout the deployment of the first cowl.

2. The apparatus of claim 1 which further includes:
   wherein the first cowl second position is dependent upon the second cowl position and wherein the first cowl is capable of traveling in a single direction relative to the second cowl.

3. The apparatus of claim 2 wherein the first actuator includes an explosive device capable of releasing the first cowl from the second cowl.

4. The apparatus of claim 3 wherein the explosive device is an explosive bolt.

5. The apparatus of claim 1 wherein the second actuator is a pneumatic actuator driven by a relatively pressurized working fluid from a compressor of an aircraft engine.

6. The apparatus of claim 1 wherein the exit area can be varied independent of the throat area.

7. An apparatus comprising:
   a gas turbine engine having a turbine disposed intermediate a primary combustor and a ramburning combustor, the ramburning combustor configured to receive products of combustion from the primary combustor;
   a convergent-divergent nozzle structured to change configuration during operation of the gas turbine engine;
   a first and second actuator capable of changing the configuration of the convergent-divergent nozzle, the second actuator configured as a one-time-use actuator that, once actuated, cannot be recalled;

a first cowl capable of being moved to a first cowl position by the first actuator; and a second cowl configured to be releasably coupled to the first cowl through the second actuator and travel along an axis of extension when released, the second cowl having a second cowl first position and a second cowl second position, the second cowl second position is dependent upon the position of the first cowl position, and wherein the second cowl is a fixed geometry cowl and includes an end that remains in a constant relative position to the first cowl when the first cowl is actuated.

8. The apparatus of claim 7 wherein the convergent-divergent nozzle includes a throat area and an exit area that are determined by the position of the first cowl and the second cowl.

9. The apparatus of claim 7 which further includes an aircraft having the nozzle and capable of operation at speeds greater than Mach 1.

10. The apparatus of claim 7 which further includes a plug nozzle, the first cowl, the second cowl, and the plug nozzle defining an exit area and a throat area.

11. The apparatus of claim 7 wherein the second actuator includes an explosive device capable of releasing the first cowl from the second cowl.

12. The apparatus of claim 11 which further includes a spring operable to urge the second cowl relative to the first cowl.

\* \* \* \* \*